(12) United States Patent
Jasin et al.

(10) Patent No.: US 11,919,719 B2
(45) Date of Patent: Mar. 5, 2024

(54) DROP AND SLIDE OUT IDLER ASSEMBLY

(71) Applicant: Benetech, Inc., Aurora, IL (US)

(72) Inventors: Kevin T. Jasin, Aurora, IL (US); Robert Cucchi, Medinah, IL (US)

(73) Assignee: Benetech, Inc., Aurora, IL (US)

( * ) Notice: Subject to any disclaimer, the term of this patent is extended or adjusted under 35 U.S.C. 154(b) by 0 days.

(21) Appl. No.: 17/739,805

(22) Filed: May 9, 2022

(65) Prior Publication Data

US 2022/0363484 A1 Nov. 17, 2022

Related U.S. Application Data

(60) Provisional application No. 63/188,174, filed on May 13, 2021.

(51) Int. Cl.
*B65G 23/04* (2006.01)
*B65G 21/12* (2006.01)

(52) U.S. Cl.
CPC ............. *B65G 23/04* (2013.01); *B65G 21/12* (2013.01); *B65G 2812/02168* (2013.01)

(58) Field of Classification Search
None
See application file for complete search history.

(56) References Cited

U.S. PATENT DOCUMENTS

| 502,194 | A | 7/1893 | Johnston |
|---|---|---|---|
| 1,047,866 | A | 12/1912 | Weller |
| 1,336,546 | A | 4/1920 | Wall |
| 1,400,658 | A | 12/1921 | Brown |
| 1,524,334 | A | 1/1925 | Brown |
| 1,789,069 | A | 1/1931 | Gove |
| 1,791,371 | A | 2/1931 | Onstad |
| 1,800,920 | A | 4/1931 | Wilson et al. |
| 1,814,619 | A | 7/1931 | Carter |
| 1,896,149 | A | 2/1933 | Zademach |
| 2,219,226 | A | 10/1940 | Gerber |

(Continued)

FOREIGN PATENT DOCUMENTS

| AU | 2005324346 A1 | 7/2006 |
|---|---|---|
| AU | 2005324346 B2 | 3/2011 |

(Continued)

OTHER PUBLICATIONS

US 11,091,332 B2, 08/2021, Lucas et al. (withdrawn)

(Continued)

*Primary Examiner* — Kavel Singh
(74) *Attorney, Agent, or Firm* — Greensfelder, Hemker & Gale, P.C.; Richard C. Himelhoch

(57) ABSTRACT

The invention is directed to a drop and slide out idler assembly that can all be removed from a first side of a conveyor system. The assembly includes a first end roller unit with a roller having an axis of rotation at an angel with respect to the horizontal, and a middle roller unit with a roller having an axis of rotation that is horizontal. The assembly further includes a second end roller having a roller that can be raised at one end to have an axis of rotation at an angle with respect to the horizontal, and lowered to have an axis of rotation that is horizontal. In the lowered position, the second end roller unit can be slid out from under a conveyor belt of the system through the first side.

20 Claims, 14 Drawing Sheets

(56) References Cited

U.S. PATENT DOCUMENTS

| | | |
|---|---|---|
| 2,249,588 A | 7/1941 | Waddle |
| 2,859,873 A | 11/1958 | Bresee |
| 3,248,018 A | 4/1966 | Fleischman |
| 3,259,078 A | 7/1966 | Radey et al. |
| 3,344,909 A | 10/1967 | Hansen et al. |
| 3,568,819 A | 3/1971 | Mann |
| 3,858,733 A | 1/1975 | Morioka et al. |
| 3,926,290 A | 12/1975 | Isojima et al. |
| 4,039,062 A | 8/1977 | Carre et al. |
| 4,062,456 A * | 12/1977 | Birdwell ................ F16L 1/207 414/745.7 |
| 4,123,334 A | 10/1978 | Emery |
| 4,164,327 A | 8/1979 | Clark |
| 4,177,736 A | 12/1979 | Przybylinski et al. |
| 4,182,591 A | 1/1980 | Stanelle |
| 4,277,214 A | 7/1981 | Mahle et al. |
| 4,363,350 A | 12/1982 | Beckerer |
| 4,371,305 A | 2/1983 | Pannell |
| 4,489,862 A | 12/1984 | Diem |
| 4,552,573 A | 11/1985 | Weis et al. |
| 4,598,823 A | 7/1986 | Swinderman |
| 4,603,769 A | 8/1986 | Bach et al. |
| 4,623,056 A | 11/1986 | Flaugher |
| 4,643,293 A | 2/1987 | Swinderman |
| 4,714,151 A | 12/1987 | Campbell et al. |
| 4,721,425 A | 1/1988 | Strocker |
| 4,775,267 A | 10/1988 | Yamamoto |
| 4,821,861 A | 4/1989 | Shanahan |
| 4,867,353 A | 9/1989 | Jacek |
| 4,877,125 A | 10/1989 | Gordon |
| 4,878,576 A | 11/1989 | Dietzen |
| 4,946,018 A | 8/1990 | Binzen et al. |
| 5,016,686 A | 5/1991 | Gerstenkorn |
| 5,024,319 A | 6/1991 | Dixon et al. |
| 5,048,669 A | 9/1991 | Swinderman |
| 5,123,542 A | 6/1992 | Hoppe |
| 5,154,271 A | 10/1992 | Binzen |
| 5,154,280 A | 10/1992 | Mott |
| 5,160,222 A | 11/1992 | Noland |
| 5,190,132 A | 3/1993 | Stanelle et al. |
| 5,248,344 A | 9/1993 | Hoppe |
| 5,291,988 A | 3/1994 | Leonard |
| 5,368,192 A | 11/1994 | Ransom, II |
| 5,372,229 A | 12/1994 | Leibling |
| 5,441,321 A | 8/1995 | Karpisek |
| 5,673,779 A | 10/1997 | Spickelmire |
| 5,685,416 A | 11/1997 | Bonnet |
| 5,697,375 A | 12/1997 | Hickey |
| 5,697,408 A | 12/1997 | Reeves |
| 5,769,573 A | 6/1998 | Faas et al. |
| 5,800,112 A | 9/1998 | Stafford |
| 5,806,324 A | 9/1998 | Shaw |
| 5,993,117 A | 11/1999 | Lancaster et al. |
| 6,019,147 A | 2/2000 | Prescott et al. |
| 6,041,907 A | 3/2000 | Bonnette |
| 6,102,195 A | 8/2000 | Weikel |
| 6,293,389 B1 | 9/2001 | Knapp et al. |
| 6,315,159 B1 | 11/2001 | Paczkowski |
| 6,575,294 B1 | 6/2003 | Swinderman et al. |
| 6,578,694 B2 | 6/2003 | Harris et al. |
| 6,681,921 B1 | 1/2004 | Schroeder |
| 6,763,935 B2 | 7/2004 | Ostman |
| 6,827,025 B2 | 12/2004 | Gaydos et al. |
| 6,921,037 B2 | 7/2005 | Wysong et al. |
| 7,000,758 B2 | 2/2006 | Bjorklund |
| 7,003,850 B2 | 2/2006 | Gaydos et al. |
| 7,028,629 B2 | 4/2006 | Walcome |
| 7,036,647 B2 | 5/2006 | Malmberg |
| 7,228,956 B2 | 6/2007 | Pircon et al. |
| 7,258,228 B1 | 8/2007 | Herren |
| 7,364,034 B1 | 4/2008 | Clark et al. |
| 7,438,171 B1 | 10/2008 | Clark et al. |
| 7,464,661 B2 | 12/2008 | Baas et al. |
| 7,484,617 B1 | 2/2009 | Flood, Jr. et al. |
| 7,571,802 B2 | 8/2009 | Bowman |
| 7,621,391 B2 * | 11/2009 | Matters ................ B65G 39/125 198/825 |
| 7,735,620 B2 | 6/2010 | Swinderman |
| 7,743,927 B2 | 6/2010 | Svatek et al. |
| 7,855,343 B2 | 12/2010 | Nakagawa et al. |
| 7,950,520 B2 * | 5/2011 | Mott ..................... B65G 39/12 198/825 |
| 7,958,992 B1 | 6/2011 | Stier |
| 8,006,830 B2 | 8/2011 | Swinderman |
| 8,319,122 B2 | 11/2012 | Kishikawa et al. |
| 8,607,964 B2 | 12/2013 | Kheifets |
| 8,727,108 B2 | 5/2014 | Dekoning |
| 8,800,756 B2 | 8/2014 | Pircon et al. |
| 8,960,419 B2 | 2/2015 | Kennedy et al. |
| 8,967,357 B2 | 3/2015 | Houssian et al. |
| 9,598,248 B2 | 3/2017 | Raiche |
| 9,919,938 B2 | 3/2018 | Soane et al. |
| 10,024,114 B2 | 7/2018 | Vandapel et al. |
| 10,035,669 B2 | 7/2018 | Harris et al. |
| 10,059,635 B2 | 8/2018 | Hay et al. |
| 10,246,265 B2 | 4/2019 | Schnitkey |
| 10,633,201 B2 | 4/2020 | D'Agostino et al. |
| 10,676,294 B2 | 6/2020 | Harrenstein et al. |
| 10,752,443 B1 | 8/2020 | Lwali et al. |
| 10,766,709 B2 | 9/2020 | Smith |
| 10,926,967 B2 | 2/2021 | Oren et al. |
| 11,027,932 B2 | 6/2021 | Harris |
| 11,066,259 B2 | 7/2021 | Warren et al. |
| 11,136,207 B2 | 10/2021 | Pircon et al. |
| 11,192,731 B2 | 12/2021 | Lucas et al. |
| 11,261,030 B2 | 3/2022 | Geysen |
| 11,273,994 B2 | 3/2022 | Huskisson et al. |
| 11,319,171 B2 | 5/2022 | Harris et al. |
| 11,332,328 B2 | 5/2022 | Harris et al. |
| 11,383,933 B2 | 7/2022 | Lurie et al. |
| 2004/0031666 A1 | 2/2004 | Ostman |
| 2006/0151280 A1 | 7/2006 | Pircon et al. |
| 2010/0072035 A1 | 3/2010 | Brody et al. |
| 2014/0054140 A1 | 2/2014 | Pircon et al. |
| 2018/0134507 A1 | 5/2018 | Lucas et al. |
| 2018/0162643 A1 | 6/2018 | Delmoni |
| 2018/0178999 A1 | 6/2018 | Sherwood et al. |
| 2018/0251306 A1 | 9/2018 | Geysen |
| 2020/0062513 A1 | 2/2020 | Hutchison et al. |
| 2020/0354174 A1 | 11/2020 | Harris et al. |
| 2020/0354175 A1 | 11/2020 | Harris et al. |
| 2021/0053781 A1 | 2/2021 | Pircon et al. |
| 2021/0188564 A1 | 6/2021 | Rutkevicius et al. |
| 2021/0261355 A1 | 8/2021 | Huskisson et al. |
| 2021/0339966 A1 | 11/2021 | Lucas et al. |
| 2022/0024707 A1 | 1/2022 | Pircon et al. |
| 2022/0080479 A1 | 3/2022 | Baker et al. |
| 2022/0106106 A1 | 4/2022 | Holmes et al. |
| 2022/0135336 A1 | 5/2022 | Geysen |

FOREIGN PATENT DOCUMENTS

| | | |
|---|---|---|
| CA | 2594426 A1 | 7/2006 |
| CA | 2594426 C | 5/2013 |
| CN | 2146460 Y | 11/1993 |
| CN | 101175679 A | 5/2008 |
| CN | 101175679 B | 12/2011 |
| DE | 1531910 A1 | 1/1970 |
| DE | 2404157 A1 | 7/1975 |
| DE | 2927316 B1 | 2/1980 |
| DE | 3023898 A1 | 1/1982 |
| EP | 0062769 A1 | 10/1982 |
| EP | 0369605 A1 | 5/1990 |
| EP | 0584441 A1 | 3/1994 |
| EP | 1129965 A2 | 9/2001 |
| EP | 1836112 B1 | 4/2012 |
| FR | 2207074 A1 | 6/1974 |
| ID | P0025168 | 2/2010 |
| JP | S5747123 A | 3/1982 |
| JP | 2534253 Y2 | 4/1997 |
| JP | H10305907 A | 11/1998 |
| JP | 2008526652 A | 7/2008 |
| JP | 5393983 B2 | 1/2014 |
| KR | 19850005816 A | 9/1985 |

(56) References Cited

FOREIGN PATENT DOCUMENTS

| | | |
|---|---|---|
| KR | 1020070106996 A | 11/2007 |
| KR | 100908762 B1 | 7/2009 |
| KR | 1020100120555 A | 11/2010 |
| KR | 1020110056815 A | 5/2011 |
| KR | 1020130050738 A | 5/2013 |
| KR | 1020150125068 A | 11/2015 |
| KR | 1020160056698 A | 5/2016 |
| LU | 70952 A1 | 3/1975 |
| MX | 269719 | 9/2009 |
| NL | 7803864 A | 10/1978 |
| RU | 2007130548 A | 2/2009 |
| RU | 2389673 C2 | 5/2010 |
| WO | 2006076140 A2 | 7/2006 |
| WO | 2014031188 A1 | 2/2014 |
| WO | 2021035041 A1 | 2/2021 |
| WO | 2021167943 A1 | 8/2021 |
| ZA | 200705630 | 7/2008 |

OTHER PUBLICATIONS

Tsubaki Conveyor of America, Inc., One-Touch Inspection Door, product sheet, Summer 2010. Applicant Note: Applicant does not have access to this reference. Applicant believes the Examiner can access the reference for U.S. Appl. No. 12/949,852.

\* cited by examiner

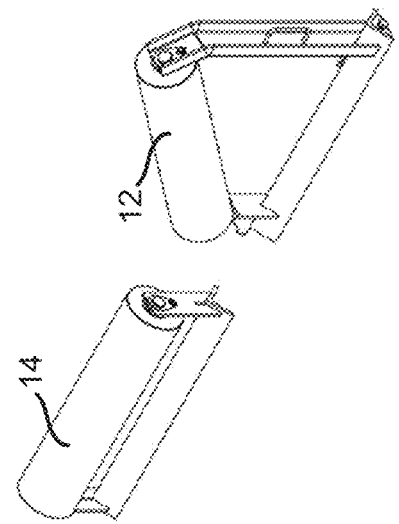
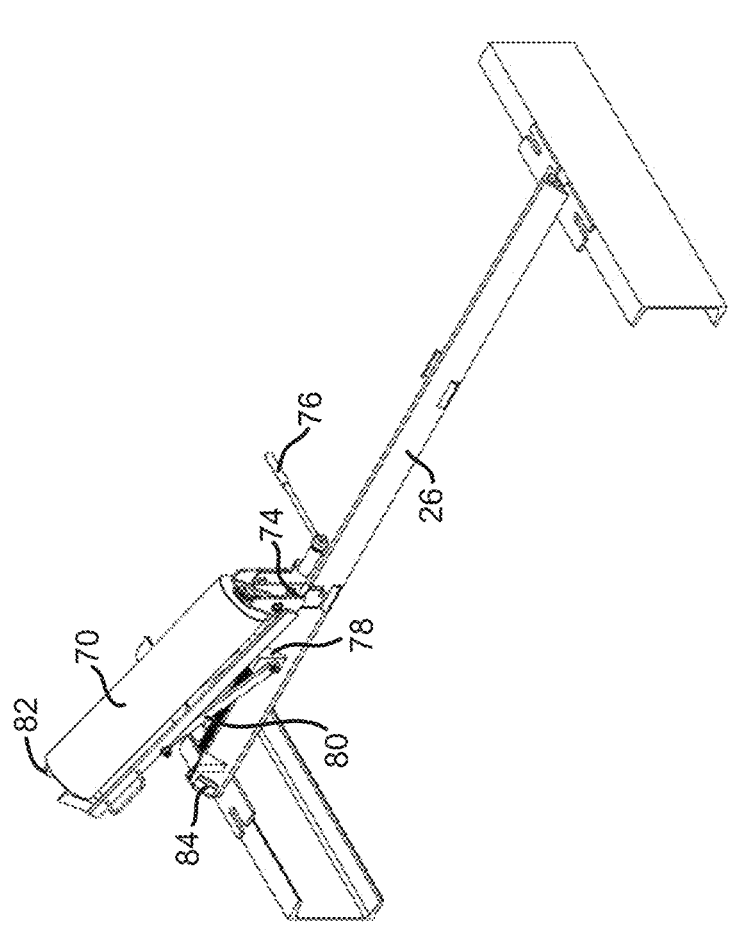
FIG. 12

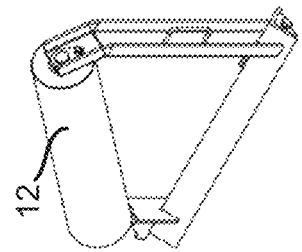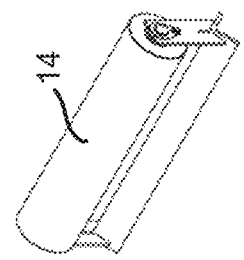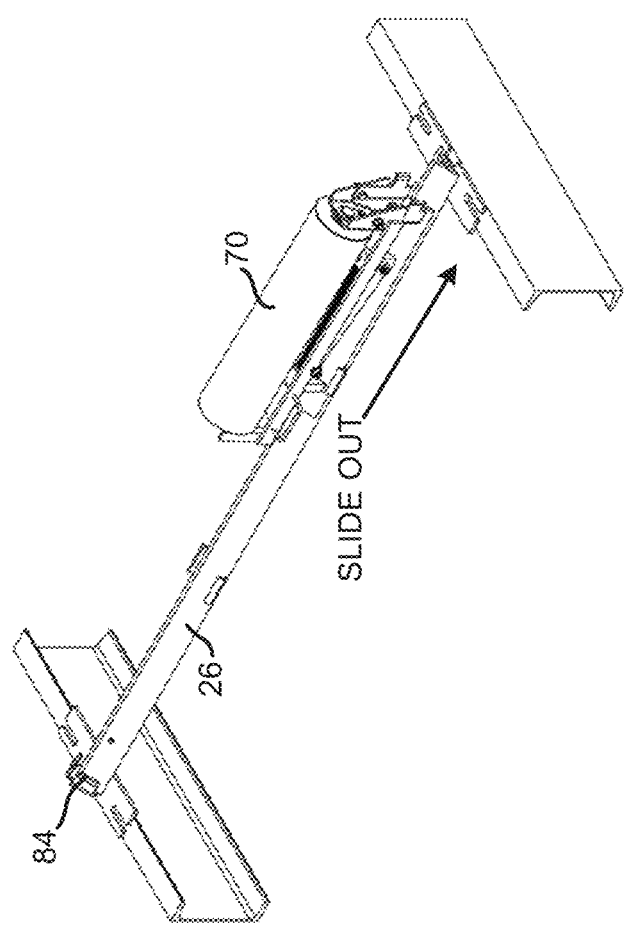
FIG. 14

DROP AND SLIDE OUT IDLER ASSEMBLY

CROSS-REFERENCE TO RELATED APPLICATIONS

The present invention claims priority to and the benefit of U.S. Provisional Patent Application No. 63/188,174 filed May 13, 2021, the contents of which are incorporated herein by reference and made a part hereof.

FEDERALLY SPONSORED RESEARCH OR DEVELOPMENT

N/A

FIELD OF THE INVENTION

The present invention generally relates to an idler assembly that can be removed from one side of a conveyor for servicing, and more particularly, to an idler assembly having a roller unit that can be dropped and raised in place from one side of the assembly to facilitate removal and service when access is limited on the opposing side.

DESCRIPTION OF THE PRIOR ART

Roller idlers are used with conveyor belts to support and facilitate movement of the conveyor belts and the product being transferred thereon. For conveyor belts typically used for moving bulk materials, an idler assembly having three roller units is typically needed. The idler assembly includes a generally horizontal middle roller unit, and two end roller units disposed at an angle on either side of the middle roller unit. The three roller units of the assembly form a generally trough-like shape to mirror the shape of the conveyor belt.

On occasion the roller units require repair, replacement or other servicing. This typically requires access to both sides of the conveyor assembly, and/or in some cases, removal of the conveyor belt. Accordingly, such repair et al. can be problematic when there is limited space on one side of the conveyor system.

The present invention provides an idler assembly having sliding roller units and an end roller unit that can be dropped for removal and raised again for use. This allows for removing and servicing all of the roller units of the assembly from one side of the conveyor system.

SUMMARY OF THE INVENTION

The present invention is directed to a drop and slide out idler assembly for use with a conveyor. The assembly is designed to permit the removal of all the idler roller units from one side of the idler assembly. Removal from one side of the idler assembly eliminates the need for accessibility from both sides, and permits the servicing and replacement of idler roller units when access to both sides of the idler assembly is restricted, unsafe or inaccessible. That is, the idler assembly of the present invention is designed to be completely dismantled, inspected and serviced by one person from one side of the conveyor.

The idler assembly incorporates a retractable, drop and slide roller unit at the far end which can be removed from the accessible side of the conveyor system. In accordance with one form of the assembly, once the near end roller unit and the middle roller unit have been removed, the far end roller unit can be removed by pulling a slide lock handle away from an end lock plate. Fixed pins connected to the slide lock handle disengage from the end lock plate and allow the end of the roller unit to drop and to retract into a lower profile horizontal position (similar to that of the middle roller unit). When in the fully retracted position, the slide lock handle will be engaged on a slide lock pin. Continued pulling of the slide lock handle will cause the dropped far end roller unit to slide along a fixed base weldment and out from underneath a conveyor belt. This allows for easy roller inspection, repair, servicing or replacement without requiring removal of the conveyor belt or access to the second side of the conveyor.

When reinstalling the assembly, the fully retracted and locked drop and slide roller unit (i.e., the far end unit) is slid onto the fixed base weldment and into track clips. Utilizing the slide lock handle, the unit can be slid underneath the conveyor belt toward the end lock plate. When the unit stops against the end lock plate, the slide lock handle is lifted to disengage it from the lock slide pin and is continued to be pushed toward the end lock plate. This action causes a support brace connected to the far end of the drop and slide roller unit to lift the unit into the full working position and simultaneously engages the fixed pins securely into the end lock plate. The slide lock handle then registers in the pocket on a pivot upright.

Once the drop and slide roller unit is installed and raised, the middle roller unit is slid on the fixed base weldment and into the track clips until a locking finger on the middle unit engages a slot on the drop and slide unit. The near end roller unit is then slid onto the fixed base weldment and is pushed toward the middle unit into the track clips until a locating finger on the near unit engages a slot in the middle unit. With all three units in place, they can be secured using a side bolt with lock washer and end bolt with lock washer.

For typical conveyor belts having widths from 18 inches to 72 inches, the drop and slide idler assembly can be designed for 20°, 35° and 45° trough angles. However, other suitable angles can be utilized as required.

The drop and slide roller unit can also be raised and lowered with other structures or apparatuses. For example, the unit can be raised and lowered using a socket and drive tool with a screw-drive assembly. The drive tool can be manual (e.g., a wrench/ratchet) or powered (e.g., powered drill). Both allow for a more controlled movement of the roller unit.

In accordance with one aspect of the invention, a removable drop and slide out idler assembly for use with a conveyor is provided. The assembly includes a base, a first end roller unit mounted to the base having a roller with an axis of rotation at a fixed angle with respect to horizontal. A middle roller unit is also mounted to the base that is couple-able on a first side to the first roller unit. The middle roller unit has a roller with a horizontal axis of rotation. The assembly further comprises a second end roller unit mounted to the base that is couple-able to a second side of the middle roller unit. The second end roller has a roller movable from a first raised position having an axis of rotation at an angle with respect to horizontal, to a retracted position wherein the axis of rotation of the roller of the second end roller unit is horizontal.

The first end roller unit, middle roller unit and second end roller unit are slidably mounted to the base and are easily removed on one side of the conveyor system. Both the middle roller unit and the second roller unit (once it has been moved to a dropped, retracted position) can be slid under the lowest portion of a trough shaped conveyor belt.

To drop the second end roller unit, the unit can comprise a slide handle pivotably mounted to a first end of a support brace. A second end of the support brace is connected to an end of the roller of the second roller unit.

The slide handle can be connected to the support brace by a fixed pin having an outwardly extending portion that extends outward from the slide handle. The base can include an end lock plate having a notch for engaging the outwardly extending portion of the fixed pin of the slide handle when the second end roller unit is in the raised position.

The second roller unit can be designed to be fully raised to 20°, 35° or 45° angle with respect to horizontal when in the raised position. Of course, other angles can be used depending on the shape and size of the conveyor belt.

The second roller unit can alternatively include a screw drive system for raising and lowering the roller on the second roller unit. A manual or powered tool (e.g., a ratchet, power hand drill) can be used to turn the screw drive to raise and lower a support brace.

Alternatively, the second roller unit can include a motorized system for raising and lowering the roller on the second roller unit or a hydraulic system for raising and lowering the roller on the second roller unit.

In accordance with another aspect of the invention, a drop and slide roller unit for an idler assembly is provided. The drop and slide roller unit comprises a frame supporting a roller having an axis of rotation. A slidable mounting structure is connected to the frame. Additionally, the unit includes an apparatus for raising a first end of the frame to a first position where the axis of rotation is at an angle with respect to the horizontal and for lowering the frame to a second position where the axis of rotation is horizontal.

The apparatus for raising and lowering the frame can comprise a slide handle and a support brace pivotably connected to the slide handle. The support brace is also connected to the first end of the frame. The slide handle can be connected to the support brace by a fixed pin having a portion that extends outward from the slide handle. Additionally, the slide handle can include a notch for receiving a locking pin.

Alternatively, the apparatus for raising and lowering the frame can comprise a screw-drive which can be operated manually or via a powered instrument (e.g., a drill). Other alternative structures can be utilized to raise and lower the roller unit.

In accordance with yet another aspect of the invention, a method for servicing an idler assembly for a conveyor having three roller units, from only a first side of the conveyor is provided. The method comprises slidably removing a first end roller unit having a roller with an angled axis of rotation from a first side of the conveyor, and slidably removing a middle end roller having a roller with a horizontal axis of rotation from the first side of the conveyor. Once the first end roller unit and middle roller unit have been removed, the method includes dropping an end of a second end roller unit having a roller with an angled axis of rotation to a position wherein the axis of rotation is horizontal. The method then includes slidably removing the second end roller unit from the first side of the conveyor.

The step of dropping an end of a second end roller unit having a roller with an angled axis of rotation to a position wherein the axis of rotation is horizontal can comprise the step of operating a screw-drive to lower the second end of the roller unit.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which:

FIG. 12 is a perspective view of the assembly of FIG. 11 with the far end roller unit partially lowered;

DETAILED DESCRIPTION

Figure 1:
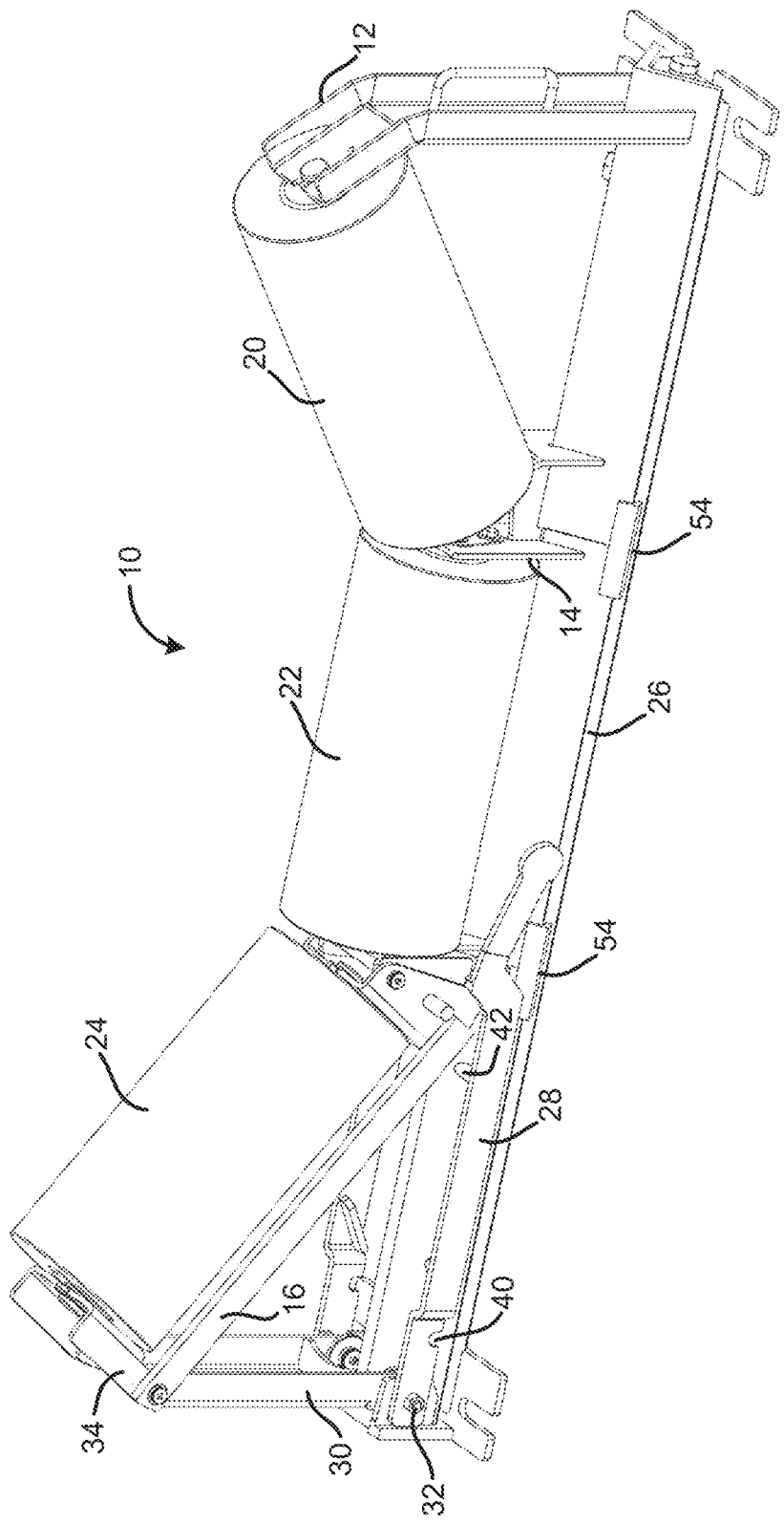
FIG. 1 is a perspective view of an idler assembly with all three roller units in position for use with a conveyor in accordance with an aspect of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-10 show removal and installation of a drop and slide idler assembly 10 in accordance with one aspect of the invention. The idler assembly 10 includes a first end roller unit 12, a middle roller unit 14 and a second end roller unit (i.e., a drop and slide roller unit) 16. The idler assembly 10 is configured to enable removal of all three roller units 12, 14, 16 from the same side of a conveyor belt system without requiring removal of the conveyor belt 18.

Each roller unit 12, 14, 16 includes a frame for supporting a cylindrical roller 20, 22, 24 having a central axis of rotation. Collectively, during operation, the rollers 20, 22, 24 in the units 12, 14, 16 are configured to form a trough like shape that mirrors the shape of the conveyor belt 18 (shown in cross-section in FIG. 10). The rollers 20, 24 in the two end roller units 12, 16 are each raised at one end such that each roller's axis of rotation is at an angle with respect to a horizontal line (represented by the base or floor). Both ends of the roller 22 in the middle unit 14 remain low and the axis of rotation is horizontal.

Each of the roller units 12, 14, 16 are configured to be slide-ably mounted to a fixed base 26 below the conveyor belt 18. The fixed base 26 can be formed from a plurality of components welded together (i.e., sometimes referred to as a fixed base weldment herein). The assembly 10 is designed to be removed from the fixed base 26, completely dismantled, inspected, and serviced by (optimally) one person from only one side of the conveyor system.

The first end roller 12 is designed to just slide off the fixed base 26 from a first side of the conveyor system as is. That is, there is no impediment to removing the first end roller 12 in the angled position it is in. Similarly, the middle roller unit 14, which is set below the lowest point of the conveyor belt 18, can also be slid out in the same direction as the first end roller unit 12. Again, there is no impediment to the unit 14 given its low horizontal position.

Figure 10:
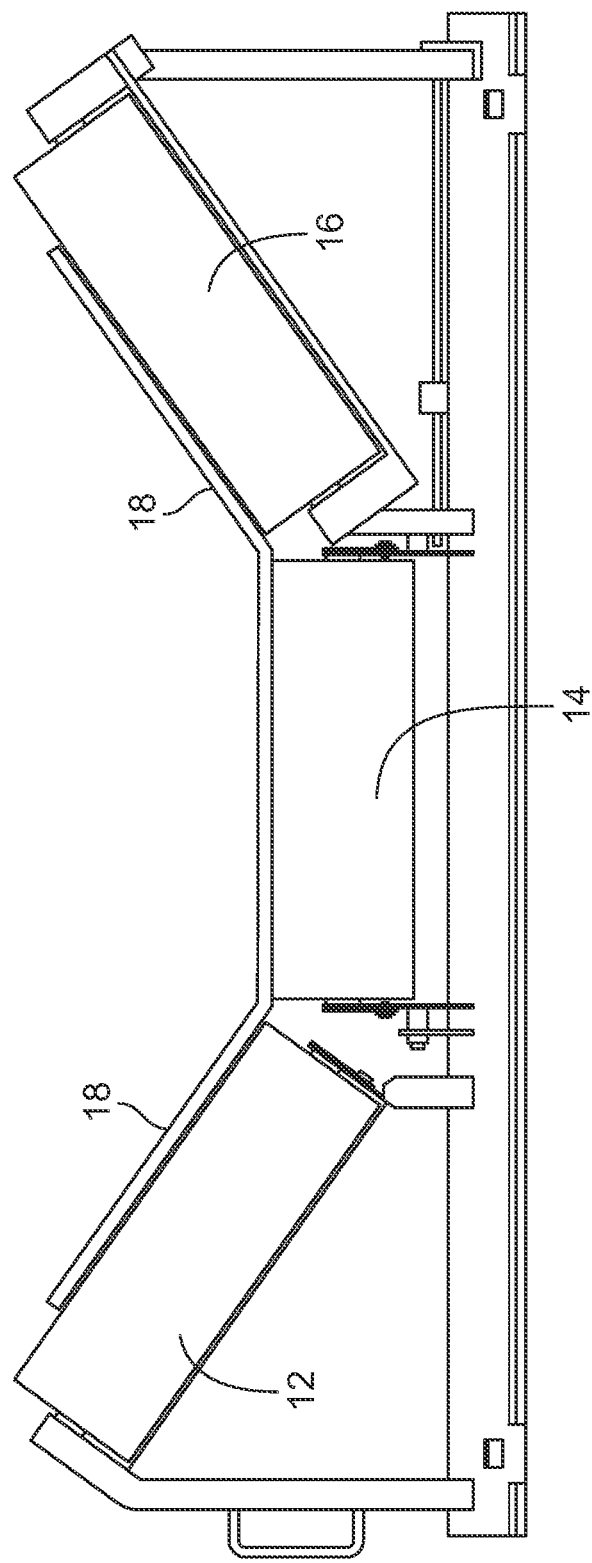
FIG. 10 is an end view of the idler assembly with the conveyor shown in cross-section.

A problem arises with attempting to remove the second end roller unit 16 (i.e., the far end—from the first side) in the same direction as the first roller unit 12 and the middle roller unit 14. Namely, the trough shape of the conveyor belt 18 blocks the second roller unit 16 while it's in an angled position as shown in FIG. 1 or 10. The present invention overcomes this obstacle by providing a roller unit that can drop (i.e., retract from the raised portion) into a low horizontal position (similar to the position of the middle roller unit 14) which allows the roller unit to slide under the conveyor belt 18 in the same manner as the middle roller unit 14 and out the first side of the conveyor system. The roller unit 16 is put back in place in a similar manner.

As shown in the embodiment of FIG. 1, the second end roller unit 16 includes a slide lock handle 28 pivotably connected to a support brace 30 by a fixed retaining pin 32 (the slide lock handle, support brace each have two portions spanning the width of the roller—each portion includes a fixed retaining pin). The support brace 30 maintains the far end 34 of the second roller unit 16 in a raised position, and is used to both raise and lower the far end 34 in combination with the slide lock handle 28.

In the raised position, the fixed retaining pin 32 is locked in a notch 36 of an end plate 38 at one end of the fixed base 26. Pulling the slide lock handle 28 disengages the fixed pin 32 from the end plate 38 and allows the end 34 of the second roller unit 16 to drop (i.e., retract) to a lower profile with the axis of rotation of the roller 24 in a horizontal position. Further pulling the handle 28 moves a notch 40 in the handle 28 to a position where it engages a lock pin 42 on the frame of the roller unit 16. This allows the unit 16 to be pulled out of the first side of the conveyor in a similar manner as the middle roller unit 14.

Figure 2:
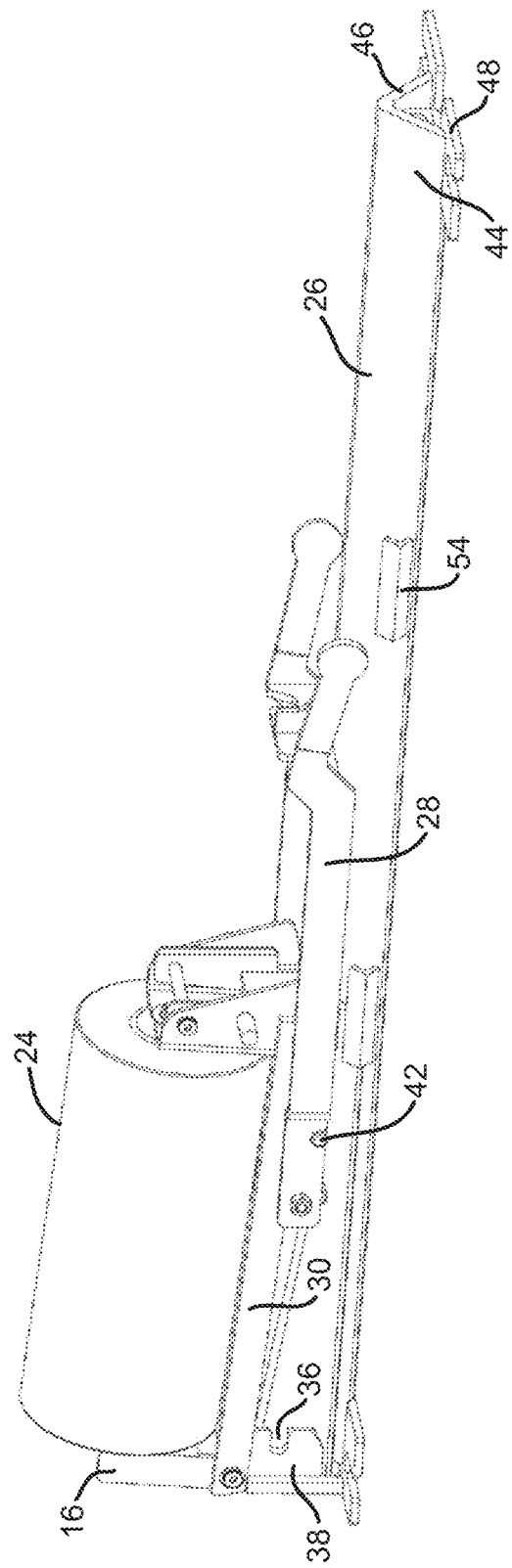
FIG. 2 is a perspective view of the far end roller unit from the assembly of FIG. 1, in a dropped position.

As is evident in FIG. 2, the fixed base 26 has a first planar angled portion 44 joined at a top most point to a second planar angled portion 46. Each end of the fixed base 26 includes a bracket 48 which can be used to secure the fixed base 26 to cross-beams 50 (see e.g., FIG. 3) using bolts 52. A plurality of track clips 54 are positioned along the fixed base 26 to support the roller units.

Figure 3:
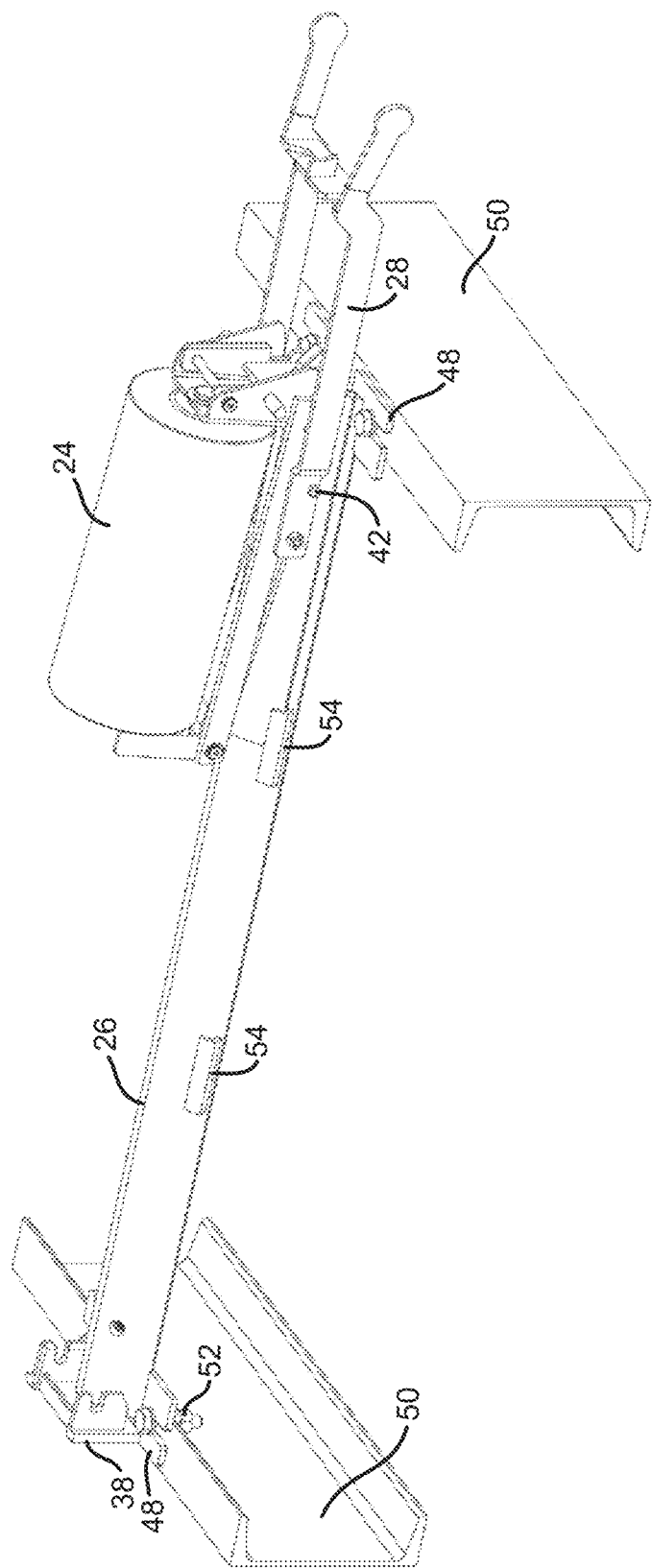
FIG. 3 is a perspective view of the far end roller unit of FIG. 2 being removed from a first side of the assembly.
Figure 4:
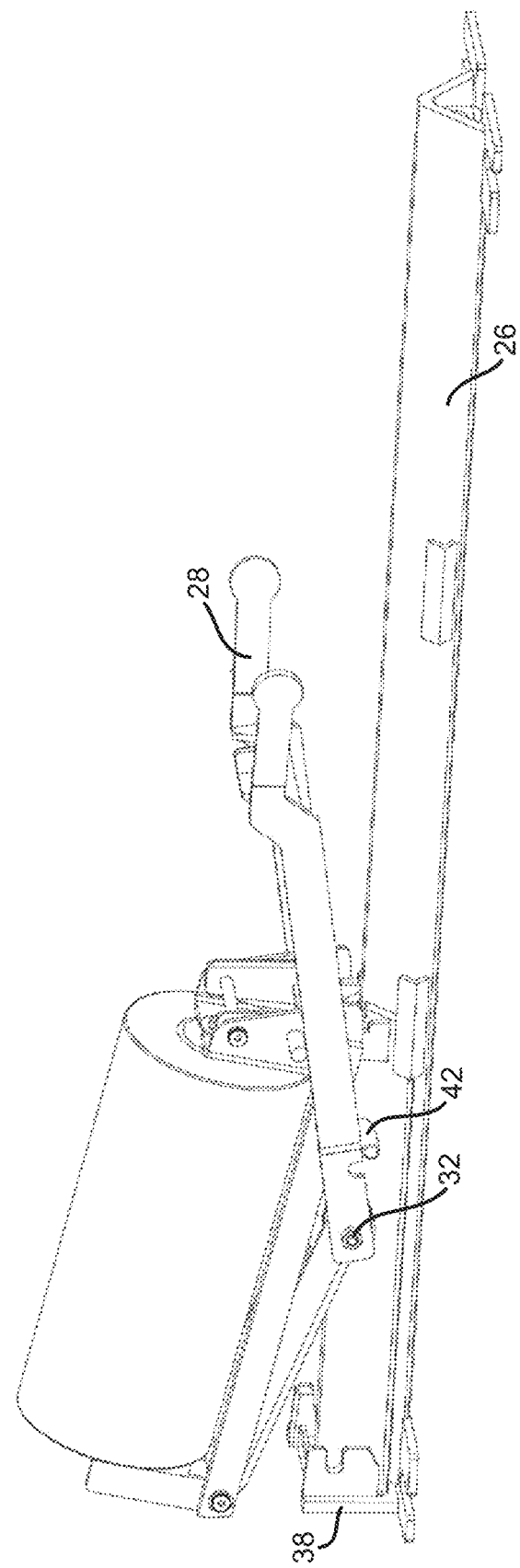
FIG. 4 is a perspective view of the far end roller unit of FIG. 2 partially raised.
Figure 5:
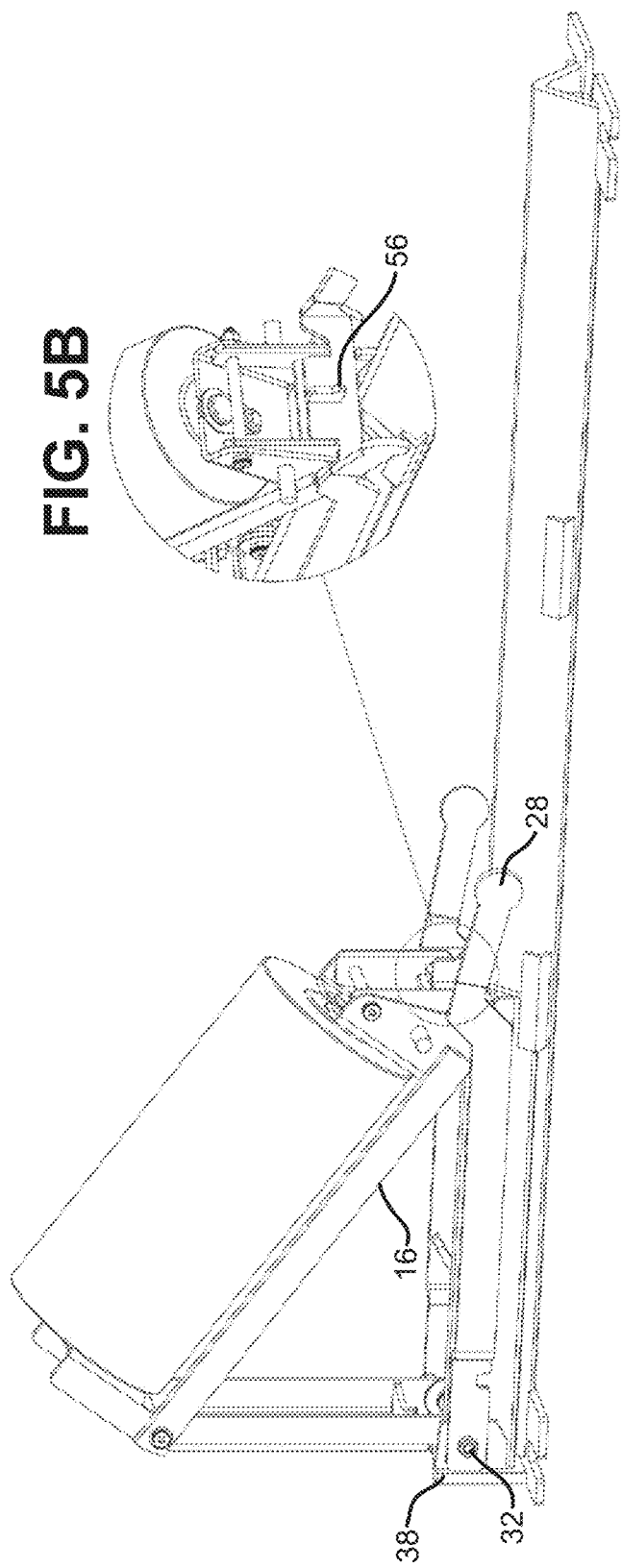
FIG. 5A is a perspective view of the far end roller unit of FIG. 2 in a raised position.
FIG. 5B is a perspective end view of the far end roller unit of FIG. 5A in the raised position.

To reinstall the assembly 10, the second roller unit 16, while in the dropped or retracted position, is placed back on the fixed base 26 on the first side of the conveyor system, and slid back toward the end plate 38 (see FIG. 3). When the unit 16 stops against the back plate 38, the slide lock handle 28 is lifted to disengage it from the slide lock pin 42 and is further pushed back toward the end plate 38. This action causes the end 34 of the second roller unit 16 to raise into a full working position, and simultaneously engages the fixed pin 32 into the slot 36 of the end plate 38 as illustrated in FIGS. 4 and 5A.

Figure 6:
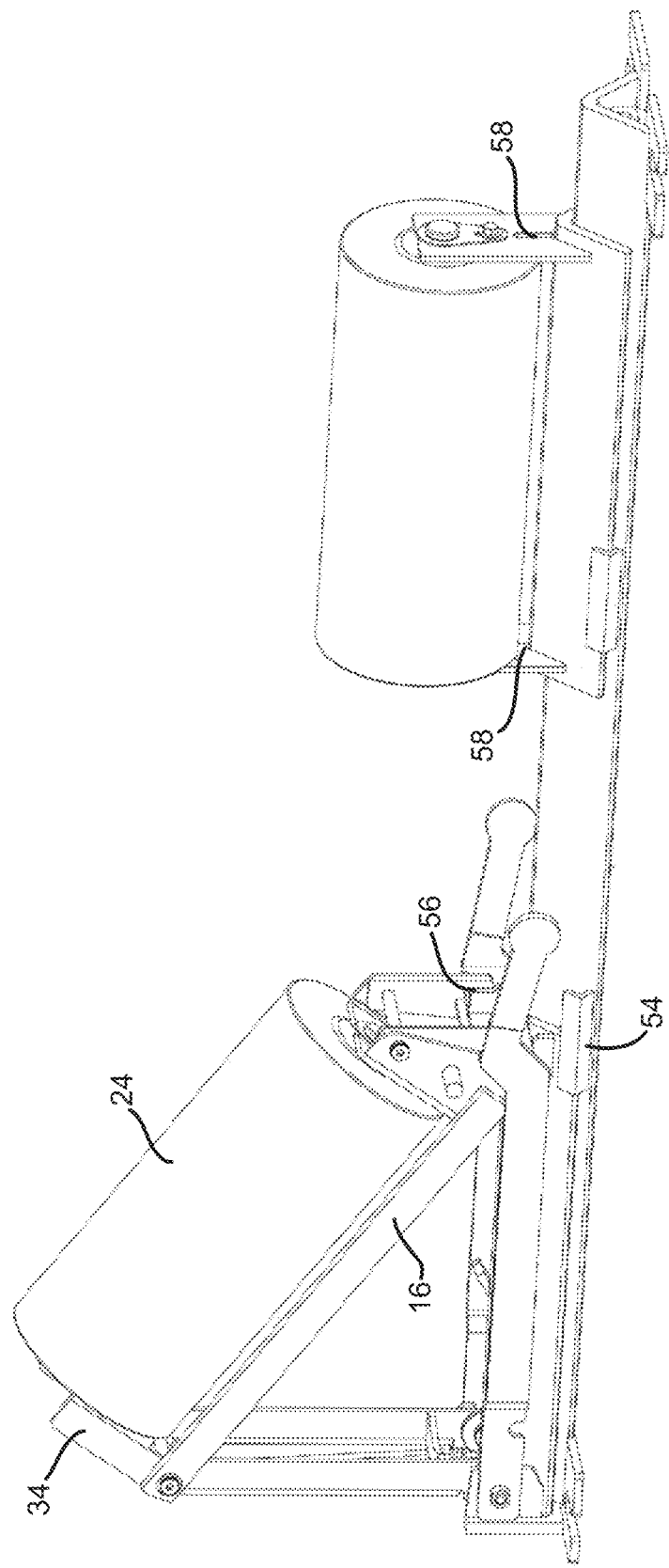
FIG. 6 is a perspective view of the middle roller unit of the assembly being slid into position next to the far end roller unit.
Figure 7:
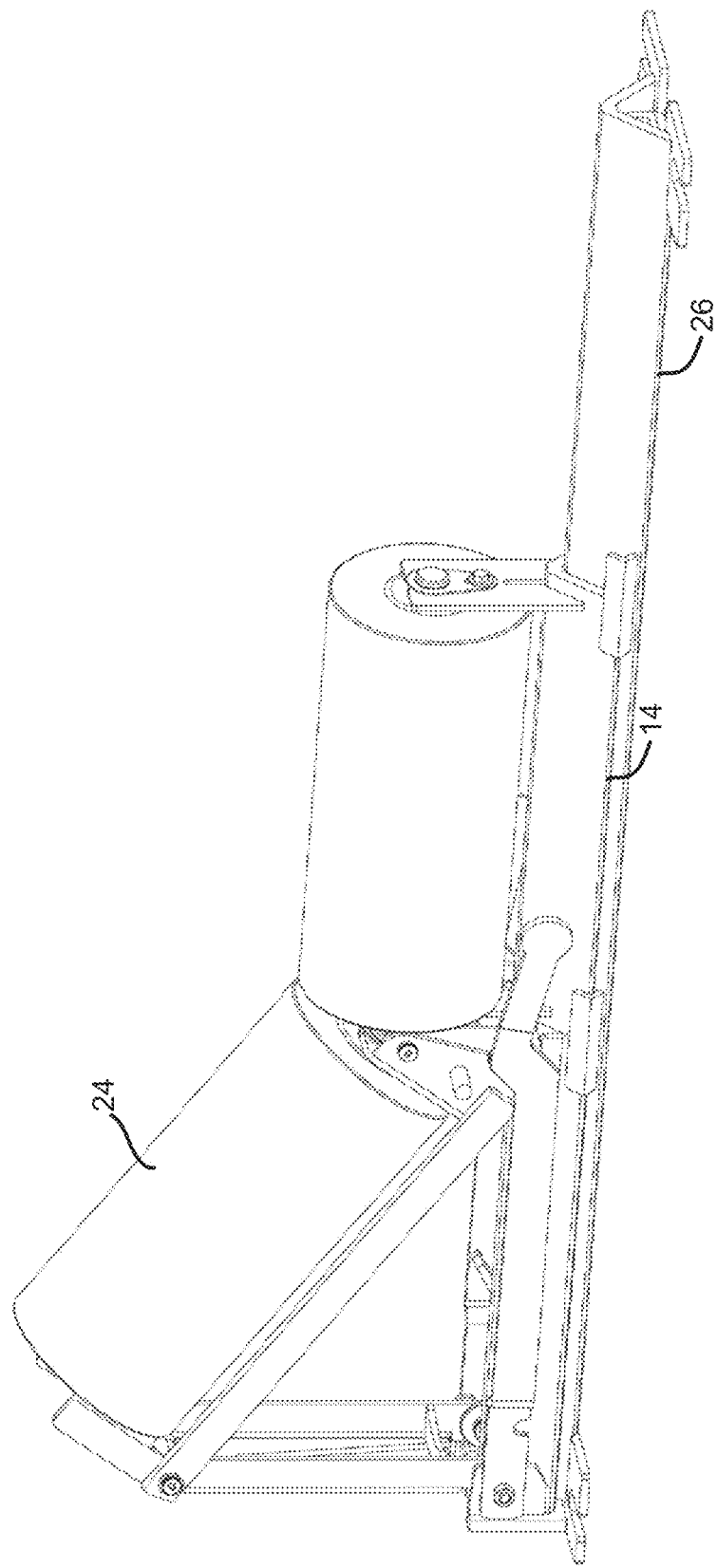
FIG. 7 is a perspective view of the middle roller unit and the far end roller unit in position.

Once the second roller unit 16 is installed and raised into position, the middle roller unit 14 can be placed on the fixed base 26 and slid into position next to the second roller unit 16 (see FIG. 6). As shown in FIG. 5B, the second roller unit 16 includes a locating finger or flange 56 that extends outward in the direction of the middle roller unit 14. The middle roller unit 14 includes a slot 58 on the side facing the second roller unit 16 (in fact, it has one slot on each side) that is aligned with the finger 56. The slot 58 engages the finger 56 as the middle roller unit 14 stops against the second roller unit 16 as shown in FIG. 7.

Figure 8:
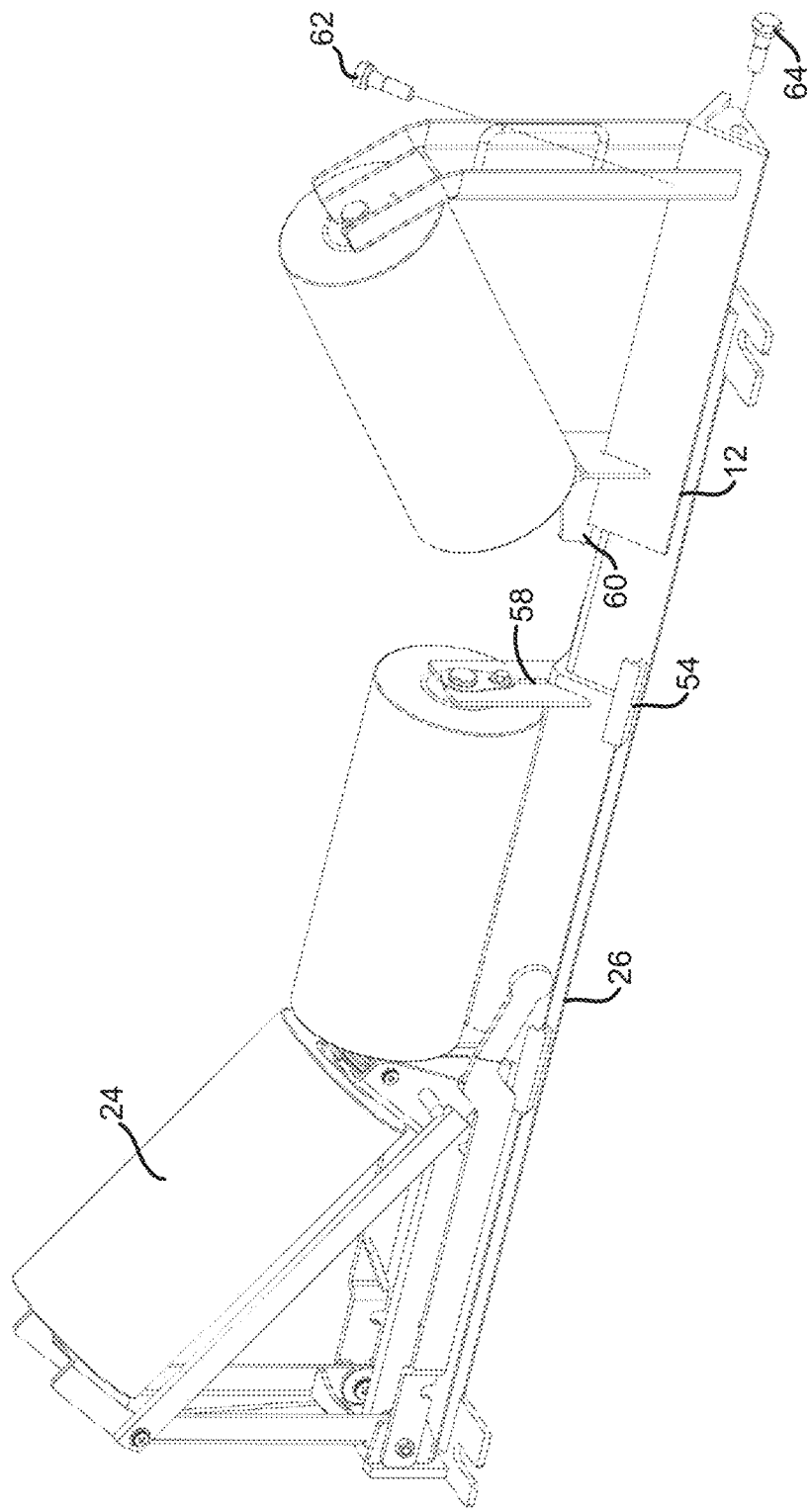
FIG. 8 is a perspective view of the near end roller unit being slid into position next to the middle roller unit.
Figure 9:
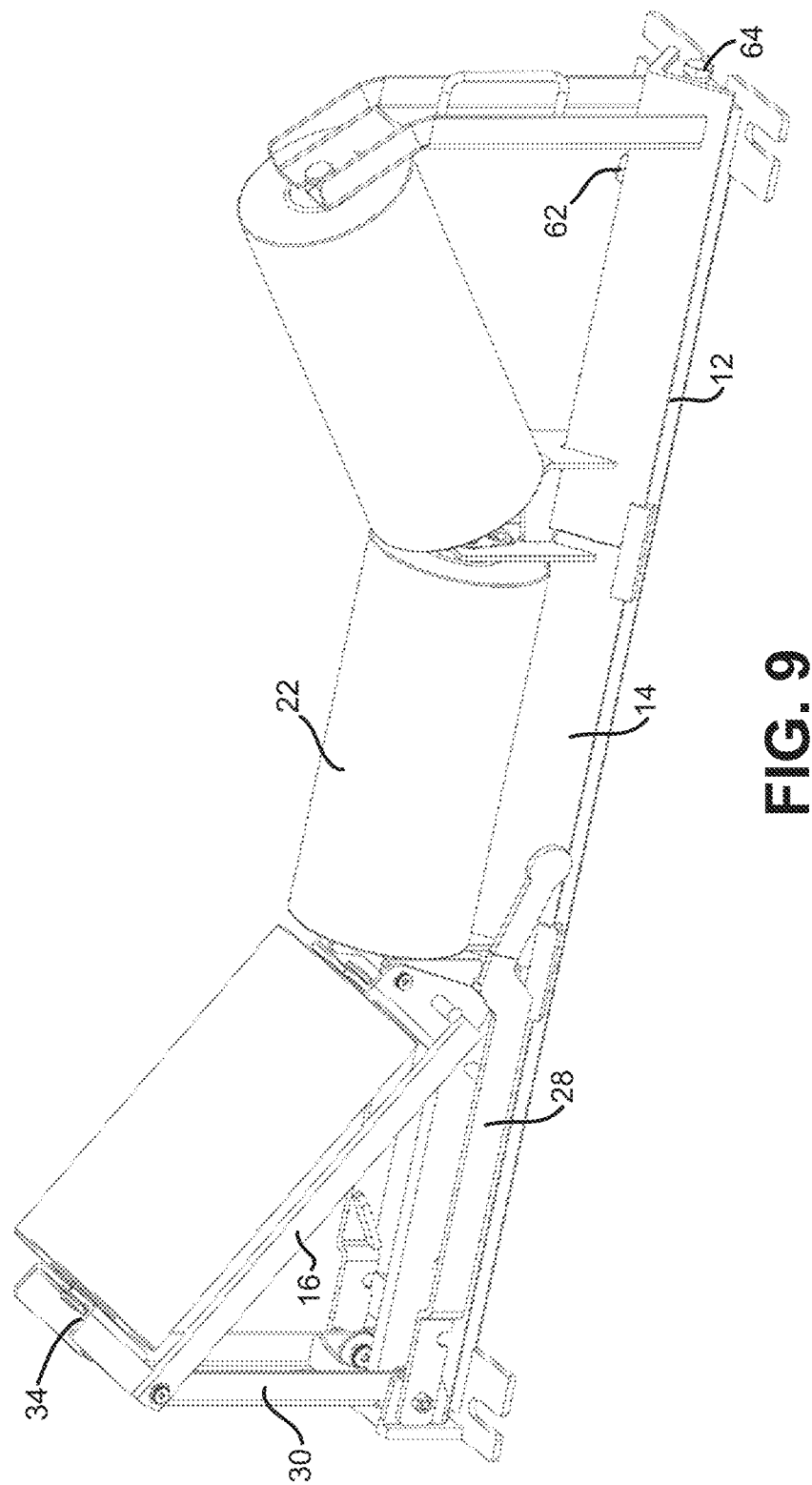
FIG. 9 is a perspective view of the idler assembly with the near roller unit in position next to the middle roller unit.

After the middle roller unit 14 is in place, the first end roller unit 12 is placed on the fixed base 26 as illustrated in FIG. 8. The first end roller unit 12 includes a locating finger 60 that aligns with a slot 58 on the side of the middle roller unit 14 facing the first end roller unit 12. The first end roller unit 12 is pushed until it stops against the middle roller unit 14 as illustrated in FIG. 9. A side bolt 60 and lock washer, and an end bolt 64 and lock washer are used to secure the units 12, 14, 16 in place. As is readily evident, the side bolt 60 and end bolt 64 need to be removed at the beginning of the process for removing the idler assembly 10.

Another form of a drop and slide roller unit 70 is shown in FIGS. 11-14. The roller unit 70 includes a screw-drive 72 that can be turned by an end nut 74 on one side of the unit 70. The screw-drive 72 can be turned manually (e.g., by a ratchet 76) or by a powered drive (e.g., a power drill).

Figure 11:
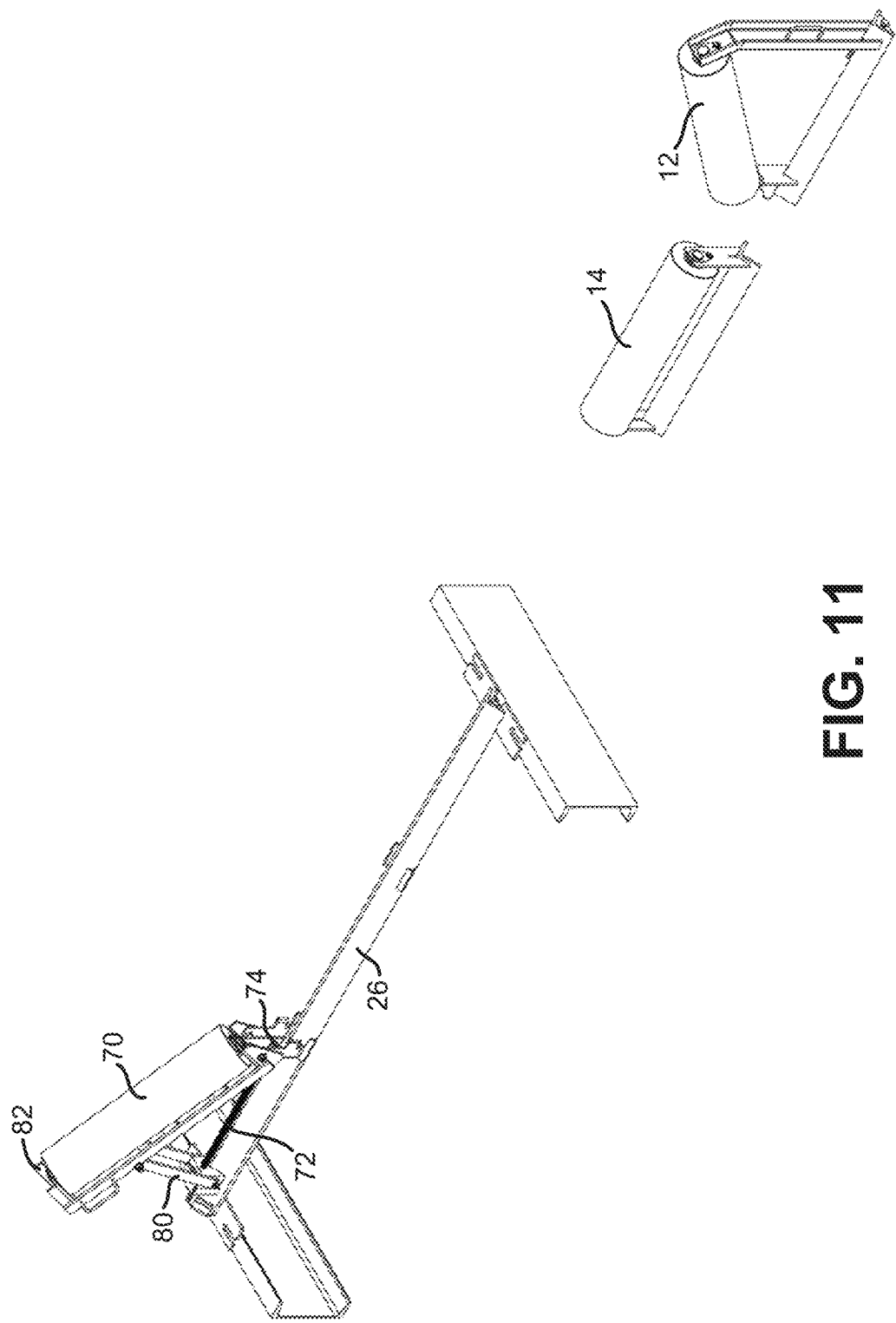
FIG. 11 is a perspective view of an idler assembly with a first end roller unit and middle roller unit removed, and a far end roller unit in a raised position.
Figure 13:
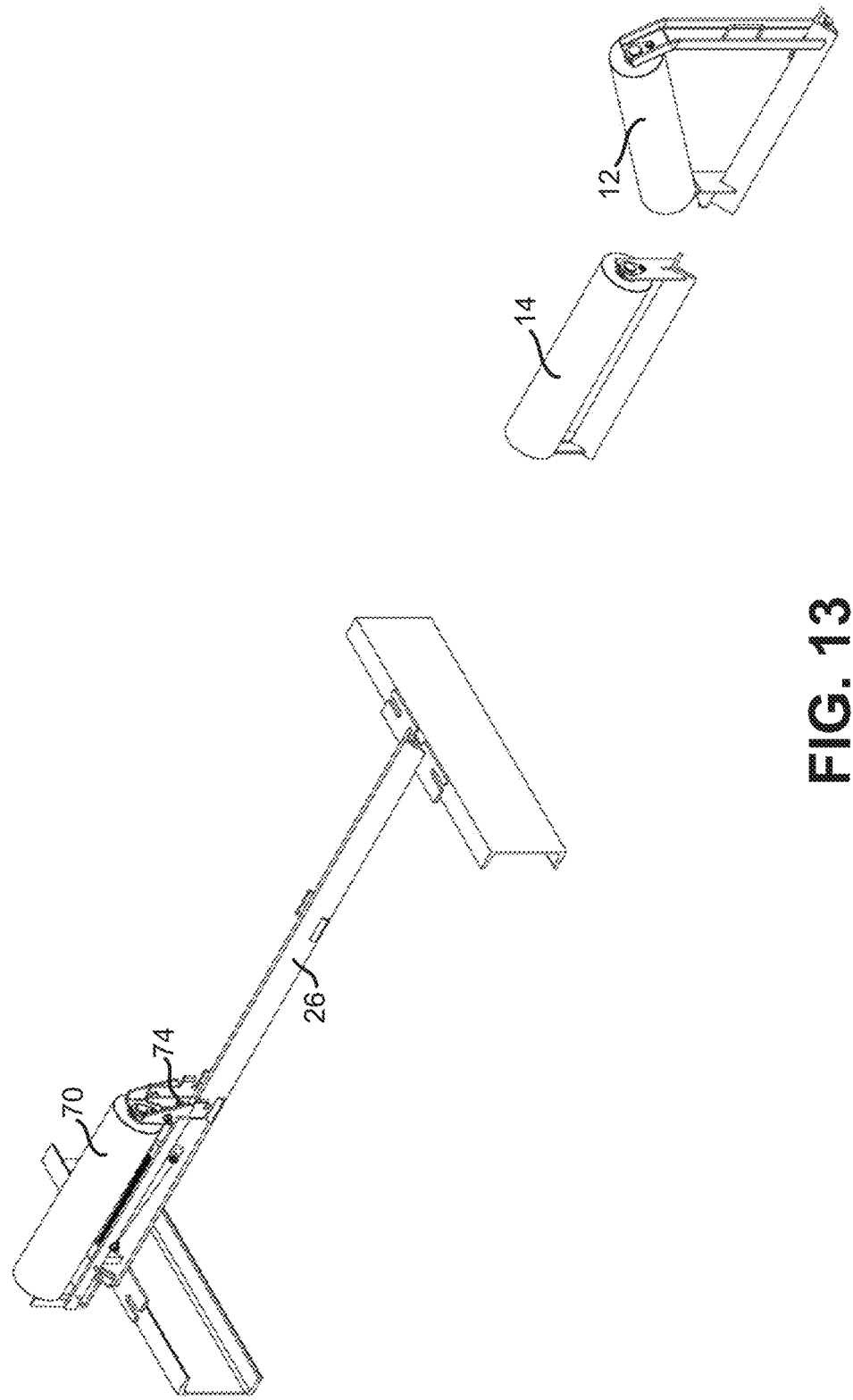
FIG. 13 is a perspective view of the assembly of FIGS. 11 and 12 with the far end roller unit completely lowered and in position for removal; and, FIG. 14 is a perspective view of the assembly of FIGS. 11-13 with the far end roller unit being slid off the base.

Turning the screw-drive 72 one direction causes a nut 78 connected to a support brace 80 (shown holding the far end 82 of the roller unit 70 in a raised position in FIG. 11) to move toward the opposite side of the drive 72 and lower the far end 82 of the roller unit 70 into a horizontal position (see FIGS. 12 and 13). Once lowered, the unit 70 can be slid outward toward the first side of the conveyor system as shown in FIG. 14. To raise the far end 82 of the unit 70 back into operating position (e.g., during installation or after servicing or repair), the screw-drive is turned the opposite direction until the nut 78 rests against the end plate 84. The screw-drive system allows for a more controlled raising and lowering of the drop and slide roller unit 70. This can prevent injury to a service person or damage to the unit (e.g., if otherwise allowed to drop too quickly).

In addition to the slide handle and screw drive systems discussed above, other structures or mechanisms can be used to raise and lower the drop and slide roller unit. For example, a variety of electric or gas powered motors can be utilized. Alternatively, a hydraulic system could be employed or a manual or powered jack apparatus.

The idler assembly can be adapted for use with a variety of trough idler configurations (including those having two or more drop and slide units, and/or middle units and/or near side units) as well as a variety of trough angles and belt widths.

Many modifications and variations of the present invention are possible in light of the above teachings. It is, therefore, to be understood within the scope of the appended claims the invention may be protected otherwise than as specifically described.

We claim:

1. A removable drop and slide out idler assembly for use with a conveyor comprising:
   a base;

a first end roller unit mounted to the base having a roller with an axis of rotation at an angle with respect to horizontal;

a middle roller unit mounted to the base that is couple-able on a first side to the first roller unit, the middle roller unit having a roller with a horizontal axis of rotation; and, a second end roller unit mounted to the base that is positioned on a second side of the middle roller unit, the second end roller having a roller movable by a slide handle engageable by an operator pivotably mounted to a support brace on the second end roller unit from a first raised position having an axis of rotation at an angle with respect to horizontal, to a retracted position wherein the axis of rotation of the roller of the second end roller unit is horizontal.

2. The removable drop and slide out idler assembly of claim 1 wherein the first end roller unit, middle roller unit and second end roller unit are slidably mounted to the base.

3. The removable drop and slide out idler assembly of claim 2 wherein the slide handle is pivotably mounted to a first end of a support brace, and wherein a second end of the support brace is connected to an end of the roller of the second roller unit.

4. The removable drop and slide out idler assembly of claim 3 wherein the slide handle is connected to the support brace by a fixed pin having an outwardly extending portion that extends outward from the slide handle.

5. The removable drop and slide out idler assembly of claim 4 further comprising an end lock plate having a notch for engaging the outwardly extending portion of the fixed pin of the slide handle when the second end roller unit is in the raised position.

6. The removable drop and slide out idler assembly of claim 1 wherein the second roller unit is at a 20° angle with respect to horizontal when in the raised position.

7. The removable drop and slide out idler assembly of claim 1 wherein the second roller unit is at a 35° angle with respect to horizontal when in the raised position.

8. The removable drop and slide out idler assembly of claim 1 wherein the second roller unit is at a 45° angle with respect to horizontal when in the raised position.

9. The removable drop and slide out idler assembly of claim 2 wherein the second roller unit includes a screw drive system for raising and lowering the roller on the second roller unit.

10. The removable drop and slide out idler assembly of claim 2 wherein the second roller unit includes a motorized system for raising and lowering the roller on the second roller unit.

11. The removable drop and slide out idler assembly of claim 2 wherein the second roller unit includes a hydraulic system for raising and lowering the roller on the second roller unit.

12. A drop and slide roller unit for an idler assembly comprising:

a frame supporting a roller having an axis of rotation;

a slidable mounting structure connected to the frame; and, an apparatus on the drop and slide roller unit engageable by an operator for raising a first end of the frame to a first position where the axis of rotation is at an angle with respect to the horizontal and for lowering the frame to a second position where the axis of rotation is horizontal.

13. The drop and slide roller unit of claim 12 wherein the apparatus for raising and lowering the frame comprises:

a slide handle on the slide and drop roller unit; and, a support brace on the slide and drop roller unit pivotably connected to the slide handle, the support brace connected to the first end of the frame.

14. The drop and slide roller unit of claim 13 wherein the slide handle is connected to the support brace by a fixed pin having a portion that extends outward from the slide handle.

15. The drop and slide roller unit of claim 12 wherein the slide handle includes a notch for receiving a locking pin on a base.

16. The drop and slide roller unit of claim 12 wherein the apparatus for raising and lowering the frame comprises:

a screw drive.

17. The drop and slide roller unit of claim 16 wherein the screw-drive can be operated manually.

18. The drop and slide roller unit of claim 16 wherein the screw-drive can be operated with a power drill.

19. A method for servicing an idler assembly for a conveyor having three roller units from only a first side of the conveyor comprising:

slidably removing a first end roller unit having a roller with an angled axis of rotation from a first side of the conveyor;

slidably removing a middle end roller having a roller with a horizontal axis of rotation from the first side of the conveyor;

dropping an end of a second end roller unit having a roller with an angled axis of rotation to a position wherein the axis of rotation is horizontal with a raising and lowering apparatus on the second roller unit engageable by an operator; and, slidably removing the second end roller unit from the first side of the conveyor.

20. The method of claim 19 wherein the step of dropping an end of a second end roller unit having a roller with an angled axis of rotation to a position wherein the axis of rotation is horizontal with a raising and lowering apparatus on the second roller unit comprises:

operating a screw-drive to lower the second end of the roller unit.

* * * * *